United States Patent [19]

Sumida

[11] 4,252,933

[45] Feb. 24, 1981

[54] SELF-BONDING SILICONE COATING COMPOSITION

[75] Inventor: Heiji Sumida, Kamine Menuma, Japan

[73] Assignee: General Electric Company, Waterford, N.Y.

[21] Appl. No.: 941,893

[22] Filed: Sep. 13, 1978

[51] Int. Cl.$^3$ .............................................. C08G 77/04
[52] U.S. Cl. .................................... 528/33; 260/18 S; 260/33.4 SB; 260/33.6 SB; 260/33.8 SB; 260/348.41; 528/31; 528/34; 528/38
[58] Field of Search ...................... 528/33, 38, 31, 34; 260/348.41, 18 S, 33.6 SB, 33.4 SB, 33.8 SB

[56] References Cited

U.S. PATENT DOCUMENTS

| | | | |
|---|---|---|---|
| 3,355,424 | 11/1967 | Brown | 528/33 |
| 3,516,964 | 6/1970 | Patterson | 528/33 |
| 3,888,815 | 6/1975 | Bessmer et al. | 260/37 SB |
| 4,033,924 | 7/1977 | Mine et al. | 528/33 |
| 4,082,726 | 4/1978 | Mine et al. | 528/33 |

*Primary Examiner*—Melvyn I. Marquis
*Attorney, Agent, or Firm*—John L. Young

[57] ABSTRACT

A self-bonding polysiloxane coating composition having therein a hydroxyl end-blocked polydiorganosiloxane polymer, and a polysiloxane having epoxy functional groups mixed with an amino-functional silicone compound. To increase the cure rate of the composition there may be also in the composition a hydride-containing polysiloxane and a metal salt of a carboxylic acid.

16 Claims, No Drawings

SELF-BONDING SILICONE COATING COMPOSITION

BACKGROUND OF THE INVENTION

The present invention relates to polyorganosiloxane compositions to be used for treating surfaces of papers, rubbers, plastics, or metals to give the surface non-sticky, water-repellent, wear-resistant, and slippery properties. The invention further relates to polyorganosiloxane compositions to be used to form primer coatings in order to enhance adhesion of other polysiloxane compositions when adhered to substrates.

Various types of polyorganosiloxane compositions have been used in treating substrate surfaces to make them non-sticky. First, there is a composition of a solution obtained by adding an SiH bond containing polyorganosiloxane and/or organo alkoxy silane to a polydiorganosiloxane having hydroxy radicals and then mixing an organic tin compound and an organic solvent. Secondly, there is an aqueous emulsion obtained by adding a Si-H bond containing polyorganosiloxane and/or organo alkoxy silane to a polydiorganosiloxane having hydroxy radicals and then adding a polyvinylalcohol or the like and emulsifying the composition with water. Thirdly, there is a composition consisting of a polyorganosiloxane having two or more vinyl radicals per molecule, a Si-H bond containing polyorganosiloxane, a platinum or platinum compound, and an organic solvent and/or a hardening inhibiter. These polyorganosiloxane compositions give substrate surfaces excellent non-sticky coatings, but have the tendency that the layer of cured silicone is easily removed from the substrate when a rubber or plastic is used for the substrate. Where the third composition is applied to a substrate of natural rubber, ordinary synthetic rubber, or soft polyvinyl chloride, the vulcanizing agent, vulcanizing accelerator, or plasticizer included in these substrates can reduce activity of the platinum or platinum compound, thereby preventing the composition from curing.

As a result of research into removing the above disadvantages and giving rubber and plastic surfaces good non-sticky, water-repellent, and wear-resistant properties, the present inventors have achieved the objects by mixing a polyorganosiloxane, having at least two monovalent hydrocarbon radicals attached to the silicon atom which radicals are replaced by a group possessing and epoxy group such as glycidoxy radical and/or epoxycyclohexyl radical and a silane and/or siloxane having a substituted or nonsubstituted amino radical attached to the silicon atom through at least one carbon atom and an alkoxy radical bonded to the silicon atom, or by a reaction of both ingredients. Although an acceptable composition was obtained in many respects sufficient slippery properties of the composition with one-time application could not be obtained.

As a result of further research, the inventors have found that a polydiorganosiloxane end-blocked with hydroxyl radicals can be added as an ingredient to the above-mentioned silane and/or siloxane with an alkoxy radical to make dealcoholization condensation with the alkoxy radical, placing the polydiorganosiloxane in a network structure, thereby providing the cured coating with slippery properties. They have also found that addition to this composition of polyorganohydrogen siloxane and a metallic fatty acid salt or metal salt of a carboxylic acid also cause a dehydrogenation condensation reaction between the hydroxyl end-blocked polyorganosiloxane and the polyorganohydrogensiloxane, thereby increasing the curing rate when cured with heat.

SUMMARY OF THE INVENTION

That is, the present invention relates to a polyorganosiloxane composition consisting essentially of:
(A) hydroxyl end-blocked polydiorganosiloxane; and
(B) a curable material selected from the group consisting of a mixture of (1) a polyorganosiloxane of the general formula

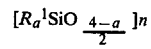

wherein $R^1$ denotes monovalent radical selected from the group of hydrogen atoms and monovalent substituted or nonsubstituted hydrocarbon radicals, with at least two of the $R^1$ per molecule being monovalent hydrocarbon radicals replaced by group possessing epoxy group and a has a value of no less than one but less than three, and n has a value of from 10 to 5,000; and (2) an amino functional silicon compound having a substituted or nonsubstituted amino radical attached to the silicon atom through at least one carbon atom and an alkoxy radical attached to the silicon atom, with the compound being mixed in such a way that the number of the amino radical is from 0.1 to 10 for every epoxy inclusive group, and the reaction product from said polyorganosiloxane (1) and said amino functional silicon compound, (2) and mixtures thereof. In addition, there is part of the present invention a polyorganosiloxane composition consisting essentially of:
(A) hydroxyl end-blocked polyorganosiloxane; and
(B) a curable material selected from the group consisting of a mixture of (1) polyorganosiloxane of the general formula

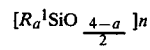

wherein $R^1$ represents a monovalent radical selected from the group of hydrogen atoms and substituted or nonsubstituted monovalent hydrocarbon radicals, with at least two of all the $R^1$s being monovalent hydrocarbon radicals replaced by epoxy pendant groups, a has a value of no less than one but less than three, and n has a value of from 10 to 5,000, and (2) an amino functional silicon compound having a substituted or nonsubstituted amino radical attached to the silicon atom through at least one carbon atom and an alkoxy radical attached to the silicon atom, with the mixture being combined in such a way that the number of the amino radical is from 0.1 to 10 for every epoxy pendant group, and a reaction product of said polyorganosiloxane (1) and of said silane and/or siloxane;
(C) a polyorganohydrogensiloxane having at least three hydrogen atoms attached to the silicon atom per molecule; and
(D) a catalytic amount of a metallic fatty acid salt or a metal salt of a carboxylic acid where the metal varies from lead to manganese in the Periodic Table.

DESCRIPTION OF THE PREFERRED EMBODIMENT

The hydroxyl end-blocked polydiorganosiloxane (A) used in the invention has, at the ends, hydroxyl radicals attached to the silicon atom, with their reactivities participating in the curing reaction. The organic radical attached to the silicon atom in the molecule can be an alkyl radical such as methyl, ethyl, propyl, butyl and hexyl; or an alkenyl radical such as vinyl or allyl; or an aryl radical such as phenyl; or an aralkyl radical such as styrenyl, or substituted hydrocarbon radical thereof, with part of its hydrogen atoms replaced by halogen atoms, nitril radicals, or the like. Usually the organo radical is the methyl radical for its easiness of synthesis and even the balance between viscosity of the composition before curing, and physical characteristics of the cured coating. The viscosity of such hydroxyl end-blocked polydiorganosiloxane is from 300 to 10,000,000 centistokes, but more preferably from 1,000 to 2,000,000 centistokes at 25° C. Viscosities less than this range make the cured coating brittle, and viscosities more than this increase the viscosity of the composition before curing, thus making it unpractical.

The polyorganosiloxane (B) (1) used in the invention contains per molecule at least two monovalent hydrocarbon radicals replaced by epoxy pendant group, such as glycidoxy or 3,4-oxycyclohexyl radical. Examples of $R^1$ other than these epoxy hydrocarbon radicals are: an alkyl radical such as hydrogen atom, methyl, ethyl, propyl, butyl or hexyl; or an alkenyl radical such as vinyl or allyl; or an aryl radical such as phenyl; or an aralkyl radical such as styrenyl, and a substituted hydrocarbon radical thereof, with part of its hydrogen atoms replaced by halogen atoms, nitrile radicals, or the like. The ends are usually terminated with triorganosilyl radicals, but may contain a hydroxyl radical attached to the silicon atom. The polymerization degree of the polyorganosiloxane is selected from the range of from 10 to 5,000, but preferably from 50 to 1,000 for ease of synthesis, workability of the composition before curing, and physical properties of the cured coating. Polymerization degrees less than this range fail to give sufficient physical properties, and polymerization degrees higher than this make not only synthesis more difficult, but also increase viscosity, thus rendering the composition difficult to work with.

The silane and/or siloxane (B) (2) used in the invention is an alkoxy silane having a substituent or nonsubstituent amino radical attached to the silicon atom through at least one carbon atom, and a siloxane obtained from fractional condensation thereof, or a polysiloxane obtained from equilibration reaction of the alkoxy silane with a cyclic polyorganosiloxane. Examples of such radicals containing substituent or nonsubstituent amino radical are: aminomethyl, β-aminoethyl, γ-aminopropyl, α-aminobutyl, γ-(methylamino)propyl, γ-(ethylamino)propyl, γ-(β-aminoethylamino) propyl radicals, and a salt with part or all of these amino radicals. The amino radical is preferably attached to the silicon atom through at least three carbon atoms, for example, the γ-aminopropyl radical does, for its stability in storage. The silane and/or siloxane, having at least one radical containing such a substituent or nonsubstituent amino radical per molecule, has, in addition, an alkoxy radical attached to the silicon atom to enhance adhesion to the substrate. Examples of the alkoxy radical are methoxy, ethoxy, propoxy, and butoxy radicals, and the methoxy and ethoxy radicals are commonly used for their easy synthesis. There are preferably at least two such alkoxy radicals per molecule to give good adhesion. A preferred compound is α-aminopropyltriethoxysilane. The addition of the silane and/or siloxane (B) (2) is selected from a range that the number of the amino radical attached to the silicon atom through at least one carbon atom in (B) (2) is from 0.1 to 10, preferably from 0.7 to 1.5 for every epoxy pendant group of the polyorganosiloxane (B) (1). Numbers of the amino radical less than this range fail to give sufficient curability and adhesion to the substrate, and too large numbers of the amino radicals not only decrease curability but also provide poorer physical properties of the cured coating.

In this invention, it is common to use a mixture of ingredients (B) (1) and (B) (2), but the reaction product from ingredients (B) (1) and (B) (2) may be used, or a mixture of the reaction product and the mixture of ingredients (B) (1) and (B) (2) may be used. However, the reaction product used herein is not the one that is cured completely, but, rather, in such a state that the amino radical of (B) (2) has reacted with part of the epoxy radicals in (B) (1).

The ratio of ingredient (A) to ingredient (B) used in the invention is not restrictive but optional. The more ingredient (A), the better the non-sticky and water-repellent properties, and the more ingredient (B), the better the wear-resistance. The amount of (B) is preferably from 0.01 to 3 parts by weight, especially from 0.1 to 1 part by weight for one part by weight of (A) since this range meets the above requirements.

The object of the invention, i.e. to give substrate surfaces non-sticky, water-repellent, wear-resistant, and slippery properties, is achieved by the composition consisting of ingredients (A) and (B), which is the basis of the invention, and by the addition of ingredients (C) and (D) to enhance the curing rate of the coating.

The polyorganohydrogensiloxane (C) used in the invention has at least three hydrogen atoms attached to the silicon atom to cause dehydrogenation condensation reaction with the hydroxyl end-blocked polydiorganosiloxane, thereby forming a network structure. Examples of the organic radical attached to the silicon atom in the molecule are: an alkyl radical such as methyl, ethyl, propyl, butyl, hexyl; or an alkenyl radical such as vinyl or allyl; or aryl radical such as phenyl; or an aralkyl radical such as styrenyl, and a substituted hydrocarbon radical thereof with part of its hydrogen atoms replaced by a halogen atom, nitril radical, or the like. The methyl radical is particularly common for its easy synthesis. The siloxane chain of such a polyorganohydrogensiloxane can be either a straight chain, branch, or ring. There is generally from 0.005 to 0.2 parts by weight of said hydrogen polysiloxane per part of hydroxy end-blocked polysiloxane (A).

The metallic fatty acid salt (D) used in the invention is the catalyst used to accelerate dehydrogenizing condensation between the hydroxyl radical of the hydroxyl end-blocked polydiorganosiloxane (A) and the Si-H bond of the polyorganohydrogensiloxane (C); and can be one having an organic radical attached directly to a metallic atom selected from lead to manganese in the Periodic Table such as dibutyltin diacetate, dibutyltin dioctoate, dibutyltin dilaurate, dibutyltin distearate, tributyltin acetate, tributyltin octoate, tributyltin laurate, dioctyltin diacetate, dioctyltin dilaurate, dioctyltin dilaurate, or monomethyltin dilaurate, or one having no organic radical attached directly to a metallic atom such as zincous octoate, ferrous octoate, or stannous octoate. The suitable amount of such a metallic fatty acid salt is from 0.6 to 6 weight percent in metal weight for the total amount of ingredients (A) and (C) and the amount of catalyst can generally be from 0.03 to 0.3 parts by weight per part of the hydroxy-terminated polysiloxane. Amounts of metal less than this range lower the curing rate, which can cause blocking after the composition applied to a substrate is treated with heat, and, on the other hand, amounts more than this increase the reaction in the treating solution, and therefore shorten the usable time.

When used for various types of substrates, the composition of the invention can comprise only the aforementioned ingredients (A) and (B), ingredients (A) through (D), an organic solvent for dilution, or a suitable emulsifying agent for emulsification with water. Examples of the organic solvent are: n-hexane, n-heptane, petroleum hydrocarbon, toluene, xylene, isopropyl-alcohol, butylalcohol, 1,1,1-trichloroetane, and trichloroethylene. The quantity of such an organic solvent can be selected according to the viscosity desired for the treating composition.

According to the invention, silica aerosol, fumed silica, precipitated silica, silica aerogel, powdered quartz, or diatomaceous earth may be added to the above composition as fillers at a concentration of 0.05 to 1 part by weight based on (A). In order to enhance further slippery properties, an inert silicone oil, particularly a polydimethylsiloxane with a high viscosity, may be added thereto.

The composition of the invention is prepared as follows:

First, both ingredients (B) (1) and (B) (2) are mixed. Both these ingredients may be simply mixed, or partially reacted, but must be in such a state that the amino radical of (B) (2) has reacted with part of the epoxy group in (B) (1) instead of the complete curing. Ingredients (B) (1) and/or (B) (2) may be mixed with this reaction product. Ingredient (A), or Ingredients (A), (C) and (D) are mixed with this to form the composition of the invention.

The composition of the invention is applied to different substrates by the following methods: dipped coating, sprayed coating, brushing, knife coating, or roller coating. These methods are used for application to a substrate made of materials such as paper, rubber, plastic or metal. When a solvent or water, is used, the solvent or water must be evaporated before the composition will cure at room temperature for several hours, or the composition may be heated a little depending upon the substrate to be cured. The recommended heating conditions are at 120°-180° C. for 10-30 seconds for substrates of paper at 150°-180° C. for 1-5 minutes for rubber, and at 70°-150° C. for 30 seconds to 2 minutes for plastic.

The composition of this invention, when applied to various substrates, provides a cured coating having superior adhesion to the substrate than ones processed with the conventional silicone compositions. Specifically, it provides an excellent adhesion, and cured coating, for rubber and plastic to which conventional silicone compositions used for forming non-sticky coatings failed to provide sufficient adhesion. The composition of the invention provides a cured coating at room temperature or at comparatively low temperatures, so that it can be applied to substrates that have low heat-resistance or are too large to heat-treat, thereby providing a cured coating having good non-adhesion to other materials, water-repellency, and wear-resistance. The cured coating obtained by this method is also good as a primer when a silicone rubber or curable, elastomeric silicon composition is adhered to a substrate. Furthermore, the composition has good slippery properties that were insufficient by the surface treating method consisting only of Ingredient (B) of the invention, which has been proposed by the same inventors.

The composition of the invention can be used to form a non-sticky and water-repellent coating on various types of substrates such as rubber, plastic, etc., and as a primer to adhere a silicone rubber to these substrates.

Examples of the invention will be described below. In the examples "parts" denotes parts by weight.

EXAMPLE 1

To 100 parts of polydimethylsiloxane having hydroxyl radicals at the ends and a viscosity of 1,000,000 centistokes at 25° C., 100 parts polydimethylsiloxane having γ-glycidoxypropyl radicals at the ends and a polymerization degree of 50, 10 parts γ-aminopropyltriethoxysilane, and 1,000 parts trichloroethylene were mixed to form the composition for treatment. This composition was applied to a sheet of chloroprene, heated at 180° C. for three minutes, and then allowed to stand at room temperature for 24 hours to form the chloroprene rubber sheet having a non-sticky surface. The silicone layer obtained had good glossy and slippery properties and exhibited no rub-off or clouding of the silicone layer when rubbed with the finger.

COMPARATIVE EXAMPLE 1

To 100 parts of hydroxyl end-blocked polydimethylsiloxane as used in Example 1, 5 parts polymethylhydrogensiloxane of the average formula $(CH_3)_3SiO[(CH_3)HSiO]_{35}Si(CH_3)_3$, 10 parts of γ-aminopropyltriethoxysilane, 2 parts zinc octoate, and 1,000 parts trichloroethylene were mixed and applied to a chloroprene rubber sheet by the same treatment as Example 1. The silicone film obtained rubbed off when rubbed with the finger.

EXAMPLE 2

To 100 parts of polydimethylsiloxane having hydroxyl radicals at the ends and a viscosity of 1,000,000 centistokes at 25° C., 100 parts of polyorganosiloxane of the average formula

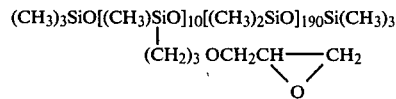

5 parts γ-(ethylamino)propyltriethoxy silane, 45 parts ethanol, and 1,900 parts hexane were mixed to form the composition for treatment. This composition was applied to a soft polyvinyl chloride film, heat-treated at 70° C. for three minutes, and then allowed to stand at room temperature for 24 hours, thereby forming a release non-sticky and good slippery coating. This coating had excellent adhesion to the substrate surface and did not rub off when vigorously rubbed with the finger.

COMPARATIVE EXAMPLE 2

The composition of Comparative Example 1 was applied to a soft polyvinyl chloride film and treated under the same conditions as Example 2. The coating obtained rubbed off when rubbed with the finger. Even though the treating temperature was increased to 100° C., the result was the same, and the film was deformed during the treatment.

EXAMPLE 4

Treated composition 41 of the invention and two comparative compositions 42 and 43 were prepared as shown in Table 2. These compositions were applied to chloroprene rubber sheets and heat-treated at 180° C. for three minutes to form release non-sticky silicone coatings on the chloroprene rubber surfaces. Table 2 shows the results of rubbing these silicone coatings with the finger.

TABLE 2

| Composition (Parts) | 41 Invention | 42 (Compar.) | 43 (Compar.) |
| --- | --- | --- | --- |
| Hydroxyl end-blocked polydimethylsiloxane (a viscosity of 800,000 centistokes) | 100 | 100 | 100 |
| $(CH_3)_3SiO[(CH_3)HSiO]_{20}Si(CH_3)_3$ | 7 | 5 | 7 |
| 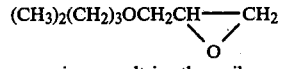 | | | |
| $(CH_3)_2(CH_2)_3OCH_2CH\underset{O}{\overset{\diagdown\diagup}{{-}{-}{-}}}CH_2$ | 100 | — | — |
| γ - aminopropyltrimethoxysilane | 10 | — | 10 |
| Toluene solution of Dibutyltin dioctoate (10 weight % of content in tin) | 20 | 20 | 20 |
| Trichloroethylene | 1,000 | 1,000 | 1,000 |
| When rubbed with the finger | | | |
| Rub-off | None | Some | Some |
| Clouding | None | Some undeter. due to many rub-offs | Some |

EXAMPLE 3

To 15 parts of fumed silica surface treated with a dimethyldichlorosilane and having a specific surface area of 200 m²/g there was mixed 100 parts of a polydimethylsiloxane having hydroxyl radicals at the ends and a viscosity of 500,000 centistokes at 25° C. thereby forming a compound-like mixture. To this mixture, 100 parts of polyorganosiloxane of the average formula

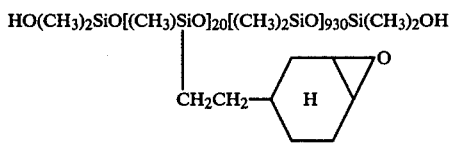

20 parts of γ-(β-aminoethyl)aminopropyltrimethoxysilane, 20 parts of isopropyl alcohol, 80 parts of methylethylketone, and 200 parts of toluene were mixed with 100 parts of the first mixture to form a composition for treatment. This composition was applied to an ethylene-propylene terpolymer rubber (EPDM) surface and heat-treated at 150° C. for five minutes after the solvent was evaporated, thereby forming a strong coating on the EPDM rubber surface. Table 1 shows the comparative wear-resistances of this coating and an untreated EPDM surface. The testing conditions were such that a stainless steel rod of 5 mm diameter was pressed to a depth of 5 mm, and reciprocated at an interval of 10 cm at a rate of 30 cycles/minute to observe the reciprocating frequency at which a fracture occurred.

TABLE I

| | Treated | Untreated |
| --- | --- | --- |
| Reciprocating frequency at which a fracture occurs (cycles) | 7,000 or more | 1,000 |

EXAMPLE 5

To 100 parts of hydroxyl end-blocked polydiorganosiloxane consisting of 92 mole percent of a dimethylsiloxy unit and eight mole percent of a diphenysiloxy unit and having a viscosity of 700,000 centistokes at 25° C., 5 parts polymethylhydrogen siloxane of the average formula $(CH_3)_3SiO[(CH_3)_2SiO]_{10}[(CH_3)HSiO]_{15}Si(CH_3)_3$ 100 parts glycidoxy-containing polyorganosiloxane of the average formula

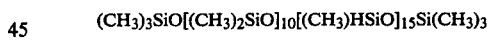

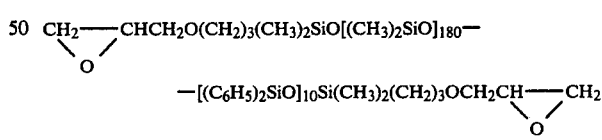

50 parts ethanol solution containing 10 percent of a γ-aminopropyl-containing polysiloxane having an average polymerization degree of 3.5, which is obtained from fractional condensation of γ-aminopropyltriethoxysilane in the ethanol, 12 parts dibutyltin diacetate, and 1,900 parts h-hexane were mixed to form treating composition 51. This composition and Comparative Compositions 42 and →used in Example 4 were applied to soft polyvinyl chloride films, respectively and heat-treated at 50° C., 70° C., and 100° C. for three minutes after solvents were dried to form silicone coatings. Table 3 shows the results of rubbing these silicone coatings with the finger to observe adhesion to the substrates.

TABLE 3

| | Heat treating Conditions | | COMPOSITIONS | | |
|---|---|---|---|---|---|
| | Temp. | Time | 51 Invention | 42 (Compar.) | 43 (Compar.) |
| Rub-off | 50 | 3" | None | Some | Some |
| | 70 | " | None | Some | Some |
| | 100 | " | None*1 | Some*3 | Some*3 |
| Cloud | 50 | " | Some | undeterminable | Some |
| | 70 | " | None | undeterminable | Some |
| | 100 | " | None*1 | undeterminable*3 | Some*3 |

*1—Test was not made since satisfactory properties were obtained.
*2—Because of many rub-off.
*3—Film was deformed.

EXAMPLE 6

To 100 parts of polydimethylsiloxane having hydroxyl radicals at the ends and a viscosity of 1,000,000 centistokes at 25° C., 5 parts

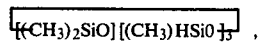

50 parts glycidoxy-containing polyorganosiloxane of the average formula

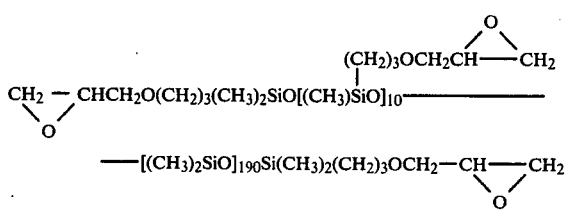

12 parts γ-aminopropyltriethoxysilane, 12 parts dibutyltin dioctoate, and 1,500 parts toluene were mixed to form a treating composition.

This was applied to kraft paper and heat-treated at 150° C. for 30 seconds after dyring the solvent to form a coating having strong, slippery, and non-sticky properties. To this was applied a 10 percent solution in toluene of a mixture consisting of 100 parts polydimethylsiloxane having hydroxyl radicals at the ends and a viscosity of 5,000 centistokes at 25° C., 10 parts of a fractional condensate of ethylsilicate, and 5 parts butyltin dioctoate, and the solvent was evaporated to cure, thereby forming an elastomeric coating that exhibited excellent adhesion. On the other hand, where the elastomeric coating was formed directly on the surface of a kraft paper without use of the previous treating composition, part of the elastomeric coating rubbed off when vigorously rubbed with the finger.

EXAMPLE 7

To 100 parts of polydimethylsiloxane having hydroxyl radicals at the ends and a viscosity of 500,000 centistokes at 25° C., 6 parts polymethylhydrogensiloxane consisting of a $(CH_3)_2HSiO_{1/2}$ unit and a $SiO_2$ unit, with the molar ratio of both units being 1:0.3, 100 parts polyorganosiloxane of the average formula

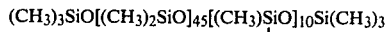

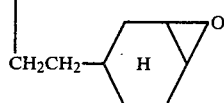

30 parts amino-containing polysiloxane of the average formula.

$H_2N(CH_2)_3Si[[O(CH_3)_2Si]_8OC_2H_5]_3$ obtained from the equilibrating reaction of γ-aminopropyltriethoxysilane with octamethylcyclotetrasiloxane were uniformly mixed. To this there was added six parts of dibutyltin dilaurate and mixed. This mixture was applied to an ABS resin surface and heated at 80° C. for one minute to form a release non-sticky coating. This coating had such excellent adhesion that it was impossible to remove easily with the fingernail.

EXAMPLE 8

To 100 parts polyorganosiloxane of the average formula

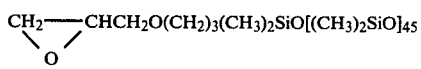

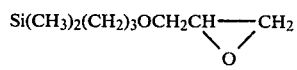

there was added 6 parts of γ-(methylamino)propyltrimethoxysilane and mixed. This mixture was heated at 100° C. for two hours to form a uniform liquid, to which were added 100 parts hydroxyl end-blocked polyorganosiloxane consisting of 0.1 mole percent of a methylvinylsiloxy unit and 99.9 mole percent of a dimethylsiloxane unit and having a viscosity of 2,000,000 centistokes at 25° C., 4 parts of a polymethylhydrogensiloxane of the average formula $H(CH_3)_2SiO[(CH_3)HSiO]_{20}Si(CH_3)_2H$ and 1,000 parts of toluene, and also 6 parts stannous octoate which was mixed uniformly to forming the treating composition. This mixture was applied to a styrene butadiene rubber surface and heat-treated at 150° C. for 2 minutes to form a release and slippery coating. This coating had such good adhesion that it could not be removed easily with the fingernail.

EXAMPLE 9

The same composition was prepared as in Example 1 except that 10 parts $[(CH_3)_3N^+(CH_2)_2NH(CH_2)_3Si(OCH_3)_3]Cl^-$ were used for the γ-aminopropyltriethoxysilane. There resulted a strong coating having release and slippery properties and excellent adhesion to the chloroprene surface.

EXAMPLE 10

Compositions 101 through 103 were prepared in the same way as Composition 41 in Example 4 except that the catalysts as shown in Table 4 were used for the dibutyltin dioctoate, and the same tests as Example 4 were conducted but the coatings were formed under the curing conditions as shown in Table 4. Each of the cured coatings did not exhibit a rub-off or clouding when rubbed with the finger.

TABLE 4

| Composition No. | Catalyst Kinds | Admixture Parts | Curing Condition Temp. | Time |
|---|---|---|---|---|
| 101 | Diocthyltin Dilaurate | 5 | 180 | 5 |
| 102 | Tributyltin Acetate | 3 | 170 | 3 |
| 103 | Zinc Octoate | 3 | 150 | 3 |

EXAMPLE 11

A treating composition the same as in Example 6 was prepared but 100 parts hydroxyl end-blocked diorganopolysiloxane consisting of 0.1 mole percent of a methylvinylsiloxy unit and 99.9 mole percent of a dimethylsiloxy unit and a viscosity of 3,000,000 centistokes at 25° C. was used as a base and applied to kraft paper to cure at 150° C. for 30 seconds immediately before the treated kraft paper was rolled up. The kraft paper had on its surface a coating having release and glossy properties but excellent adhesion.

EXAMPLE 12

To 15 parts fumed silica having a specific surface area of 300 m²/g there was mixed 100 parts hydroxyl end-blocked diorganopolysiloxane consisting of 25 mole percent of a methyl (3,3,3,-trifluoropropyl) siloxy unit and 75 mole percent of a dimethylsiloxy unit and having a viscosity of 900,000 centistokes at 25° C. and kneaded, thereby forming a compound-like mixture. To 100 parts of this mixture there were mixed seven parts [(CH$_3$)HSiO]$_4$, 100 parts polyorganosiloxane of the average formula (CH$_3$)$_3$SiO[(CH$_3$)SiO]$_{20}$[(CH$_3$)SiO]$_{100}$[(CH$_3$)$_2$SiO]$_{650}$Si(CH$_3$)$_3$
| |
| CH$_2$CH$_2$CF$_3$
|
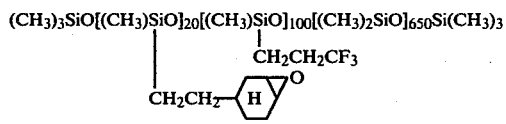

20 parts γ-(β-aminoethyl)aminopropyltrimethoxysilane, 10 parts dibutyltin diacetate, 20 parts isopropylalcohol, 80 parts methylethylketone, and 200 parts toluene to form a composition. This composition was applied to an EPDM rubber and heat-treated at 150° C. for five minutes after drying of the solvent to form a wear-resistant coating on the rubber surface.

EXAMPLE 13

To 100 parts of hydroxyl end-blocked polydimethylsiloxane as used in Example 1, five parts polymethylhydrogensiloxane as used in Example 5, 100 parts glycidoxy-containing polyorganosiloxane as used in Example 6, 10 parts γ-aminopropyltriethoxysilane, one part stannous octoate, and 1,000 parts trichloroethylene were mixed to form a treating composition. This composition was applied to an EPDM sponge surface and heat-treated at 130° C. for five minutes to form a release surface on the EPDM sponge. This sponge was put between two glass plates and allowed to stand in a thermohygrostat at 45° C. at 70 percent humidity for 60 hours under a load of 50 g/cm² and then returned to room temperature, with the load removed, to conduct a release test. The same release test was made on an untreated EPDM sponge for comparison. These test results are shown in Table 5.

TABLE 5

| | Treated | (Comparative) Untreated |
|---|---|---|
| Releasing force after pressed adhered | 95 grams | 630 grams |

EXAMPLE 14

The treatment composition prepared in Example 13 was applied to the surface of an EPDM plate and heat-treated at 150° C. for five minutes to provide the EPDM plate with a release surface. The coefficient of static friction between this EPDM plate and a glass plate was measured. The same measurement ws made on an EPDM plate untreated with silicone for comparison. Table 6 shows the respective measurements from which it is apparent that treatment with the composition of the invention enhances the slippery properties of glass.

TABLE 6

| | Treated | (Comparative) Untreated |
|---|---|---|
| Coefficient of static friction | 0.45 | 2.1 |

I claim:

1. A self-bonding polyorganosiloxane coating composition, comprising (A) hydroxyl end-blocked polydiorganosiloxane; having a viscosity varying from 300 to 10,000,000 centistokes at 25° C. wherein the organo groups are monovalent hydrocarbon radicals; (B) a silicone mixture selected from the group consisting of a mixture of (1) polyorganosiloxane of the general formula

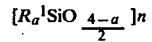

wherein R$^1$ represents a monovalent radical selected from the group consisting of hydrogen atoms and substituted or nonsubstituted monovalent hydrocarbon radicals, wherein at least two of all the R$^1$ radicals per molecule are monovalent hydrocarbon radicals replaced by groups possessing epoxy groups, a has a value of no less than one but less than three, and n has a value of from 10 to 5,000, and (2) an amino functional silicon compound having a substituted or nonsubstituted amino radical attached through at least one carbon atom to the silicon atom and an alkoxy radical attached to the same silicon atom, the compound being mixed in such a way that the number of the amino radical in (2) is from 0.1 to 10 for every group possessing an epoxy group in (1), and the reaction product of said polyorganosiloxane (1) and said amino functional silicon compound, (2) and mixtures thereof.

2. A composition as claimed in claim 1 wherein R$^1$ of the polyorganosiloxane (1) is a monovalent hydrocarbon radical selected from methyl radicals and monovalent hydrocarbon radicals replaced by groups possessing epoxy group.

3. A composition as claimed in claim 1 where the substituted or nonsubstituted amino radical of the amino functional silicon compound is attached to the silicon atom through at least three carbon atoms.

4. A polyorganosiloxane composition as claimed in claim 1, further comprising (C) a polyorganohydrogensiloxane having at least three hydrogen atoms attached to the silicon atom per molecule (D); and a catalytic amount of a metallic carboxylic acid salt.

5. The self-bonding composition of claim 1 wherein per 1 part by weight of the hydroxyl end-blocked polydiorganopolysiloxane polymer, there is from 0.01 to 3 parts by weight of the silicone mixture of epoxy functional siloxane and the amino functional silicon compound, or the reaction product thereof.

6. A self-bonding silicone composition of claim 4 where per 1 part by weight of the hydroxyl end-blocked polydiorganopolysiloxane polymer there is present from 0.01 to 3 parts by weight of the silicone mixture of the epoxy functional siloxane and the amino functional silicone compound from 0.005 to 0.2 parts by weight of the hydride polysiloxane and from 0.03 to 0.3 parts by weight of the metal salt of a carboxylic acid.

7. A self-bonding composition of claim 1 wherein the amino functional silicon compound is gammaminopropyltriethoxy silane.

8. The self-bonding composition of claim 1 wherein the epoxy pended group in (B) (1) is selected from the class consisting of glycidoxy radicals and 3,4-oxycyclohexyl radicals and mixtures thereof.

9. A process for forming a self-bonding polysiloxane coating composition comprising (i) mixing (A) hydroxyl end-blocked polydiorganosiloxane having a viscosity varying from 300 to 10,000,000 centistokes at 25° C. where the organo groups are monovalent hydrocarbon radicals; (B) a silicone mixture selected from the group consisting of a mixture of (1) polysiloxane of the general formula

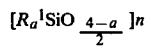

where $R^1$ represents a monovalent radical selected from the group consisting of hydrogen atoms and substituted or nonsubstituted monovalent hydrocarbon radicals, wherein at least two of all the $R^1$ radicals per molecule are monovalent hydrocarbon radicals replaced by groups possessing epoxy groups, a has a value of no less than one but less than three, and n has a value of from 10 to 5,000 and (2) an amino functional silicon compound having a substituted or nonsubstituted amino radical attached through at least 1 carbon atom to the silicone atom and an alkoxy radical attached to the same silicon atom, the compound being mixed in such a way that the number of the amino radical in (2) is from 0.1 to 10 for every group possessing an epoxy group in (1), and the reaction product of said polyorganosiloxane (1) and said amino functional silicon compound (2) and mixtures thereof, and (ii) allowing the composition to cure.

10. The process of claim 9 where $R^1$ in the epoxy functional polysiloxane (1) is a monovalent hydrocarbon radical selected from methyl and from monovalent hydrocarbon radicals replaced by groups possessing epoxy group.

11. The process of claim 9 wherein the substituted or nonsubstituted amino radical of the amino functional silicon compound is attached to the silicone atom through at least 3 carbon atoms.

12. The process of claim 9 further comprising, adding to the mixture prior to cure (C) a polyorganohydrogen siloxane having at least 3 hydrogen atoms attached to a silicon atom per molecule and (D) a catalytic amount of a metal salt of carboxylic acid.

13. The process of claim 9 wherein in mixture (i) there is present from 0.01 to 3 parts by weight of the silicone mixture of the epoxy functional polysiloxane and the amino functional silicon compound per part of the hydroxy end-blocked polydiorganosiloxane polymer.

14. The process of claim 12 wherein in mixture (i) per part of said hydroxyl end-blocked polydiorganosiloxane polymer, there is present from 0.01 to 3 parts by weight of a silicone mixture of the epoxy functional polysiloxane polymer and the amino functional silicon compound from 0.005 to 0.2 parts of the organohydrogen polysiloxane compound and from 0.03 to 0.3 metal salt of a carboxylic acid.

15. The process of claim 9, wherein the amino functional silicon compound is gammaminopropyltriethoxy silane.

16. The process of claim 9, wherein the epoxy functional group in the epoxy functional compound (B) (1) is selected from the class consisting of glycidoxy and 3,4-oxycyclohexyl radicals and mixtures thereof.

* * * * *